United States Patent
Liu et al.

(10) Patent No.: US 9,172,298 B2
(45) Date of Patent: Oct. 27, 2015

(54) FULLY-CONTROLLED BRIDGE RECTIFYING DEVICE WITH SURGE SUPPRESSION FUNCTION

(71) Applicant: China Greatwall Computer Shenzhen Co., Ltd., Shenzhen (CN)

(72) Inventors: Zugui Liu, Shenzhen (CN); Jiyong Yu, Shenzhen (CN); Changbin Huang, Shenzhen (CN); Yuqing Qi, Shenzhen (CN); Kaiwen Yao, Shenzhen (CN); Luojian He, Shenzhen (CN); Yong Lan, Shenzhen (CN); Jiwu Jia, Shenzhen (CN)

(73) Assignee: China Greatwall Computer Shenzhen Co., Ltd., Shenzhen (CN)

( * ) Notice: Subject to any disclaimer, the term of this patent is extended or adjusted under 35 U.S.C. 154(b) by 0 days.

(21) Appl. No.: 14/278,861

(22) Filed: May 15, 2014

(65) Prior Publication Data
US 2014/0247631 A1 Sep. 4, 2014

Related U.S. Application Data

(63) Continuation-in-part of application No. PCT/CN2013/070246, filed on Jan. 9, 2013.

(51) Int. Cl.
*H02M 1/12* (2006.01)
*H02M 1/32* (2007.01)
*H02M 1/36* (2007.01)
*H02M 7/219* (2006.01)
*H02M 7/12* (2006.01)
*H02M 1/44* (2007.01)

(52) U.S. Cl.
CPC *H02M 1/32* (2013.01); *H02M 1/36* (2013.01); *H02M 1/44* (2013.01); *H02M 7/125* (2013.01); *H02M 7/219* (2013.01); *H02M 2007/2195* (2013.01); *Y02B 70/1408* (2013.01)

(58) Field of Classification Search
CPC ......... H02M 7/02; H02M 7/12; H02M 7/125; H02M 7/219; H02M 2007/2195; H02M 1/32; H02M 2001/322; H02L 23/552; H01C 7/12
USPC ........... 363/37, 38, 44, 48, 52, 67, 81, 84, 86, 363/108, 114, 125; 307/104; 361/117, 118, 361/126, 146, 100, 110
See application file for complete search history.

(56) References Cited

U.S. PATENT DOCUMENTS

| | | | |
|---|---|---|---|
| 5,604,411 A | * | 2/1997 | Venkitasubrahmanian et al. ............... 315/307 |
| 5,608,295 A | * | 3/1997 | Moisin .......... 315/247 |

(Continued)

FOREIGN PATENT DOCUMENTS

| | | |
|---|---|---|
| CN | 2494576 Y | 6/2002 |
| CN | 101924484 A | 12/2010 |

*Primary Examiner* — Timothy J Dole
*Assistant Examiner* — Shahzeb K Ahmad
(74) *Attorney, Agent, or Firm* — Winstead PC

(57) ABSTRACT

The present invention is suitable for a power supply control field, and provides a fully-controlled bridge rectifying device with surge suppression function. In the embodiment of the present invention, the electric equipment uses a fully-controlled bridge rectifying device with surge suppression function comprising a driving module, a first controllable half-bridge module, an isolation driving module, a second controllable half-bridge module, a half-bridge module and a current limiting resistor. At the starting moment of the electric equipment, the first controllable half-bridge module cooperates the half-bridge module to carry out the bridge rectifier for the alternative current to charge the filter capacitor quickly, and the surge is suppressed by the current limiting resistor, when the electrical equipment work from starting state transits to a stable work state, the first controllable half-bridge module cooperates the second controllable half-bridge module to carry out the fully-controlled bridge rectification for the alternative current to provide direct current to the electric device, the whole fully-controlled bridge rectifying device has the advantages of simple structure, low cost and small volume, and also effectively reduces the power consumption of the equipment.

6 Claims, 2 Drawing Sheets

(56) References Cited

U.S. PATENT DOCUMENTS

| | | | |
|---|---|---|---|
| 5,650,925 A | * | 7/1997 | Hesterman .................... 363/132 |
| 5,751,115 A | * | 5/1998 | Jayaraman et al. ........... 315/225 |
| 5,822,203 A | * | 10/1998 | Peron ............................ 363/125 |
| 2005/0156774 A1 | * | 7/2005 | Li et al. ......................... 341/155 |
| 2006/0268589 A1 | * | 11/2006 | Nakahori ...................... 363/132 |
| 2013/0100710 A1 | * | 4/2013 | Kang et al. ................. 363/21.12 |
| 2013/0114175 A1 | * | 5/2013 | Song ............................... 361/86 |
| 2015/0048757 A1 | * | 2/2015 | Boonen et al. ................ 315/294 |

\* cited by examiner

US 9,172,298 B2

FULLY-CONTROLLED BRIDGE RECTIFYING DEVICE WITH SURGE SUPPRESSION FUNCTION

CROSS-REFERENCE TO RELATED APPLICATIONS

This patent application is a continuation-in-part application of International Patent Application No. PCT/CN2013/070246, which application was filed on Jan. 9, 2013. International Patent Application No. PCT/CN2013/070246 is incorporated by reference.

TECHNICAL FIELD

The present invention relates to a power supply control field, in particular, to a fully-controlled bridge rectifying device with surge suppression function.

BACKGROUND

At present, in the high frequency switch power supply system, the industrial frequency alternating current (ac) is generally converted to the direct current by the rectifying device and then is delivered to the subsequent circuit. The most commonly used rectifier device is the bridge rectifier circuit, because the subsequent circuit usually contains a filter capacitor with large capacitance, a anti-surge circuit must be added into the input circuit to avoid the surge current caused by quick charge of the filter capacitor during the starting of electrical equipment which leads to a damage of the rectifying device, filter capacitor or other device. To this, the simplest method of preventing a surge is implemented by adding a current limiting resistor (it is usually a negative temperature coefficient thermistor) in series with the input circuit, in order to prevent the influence of the current limiting resistor on the conversion efficiency, usually a switching device (it can be a relay or semiconductor switch) is connected to the current limiting resistor in parallel.

In FIG. 1, the circuit with the reference number 100 is the bridge rectifier and surge control circuit in the prior art. At the starting moment of the electric equipment, the alternating current (ac) flows through the fuse F1, EMI filter network 200 in the electric equipment, then is limited by a current-limiting resistor Rt (the control switch 101 is off), is rectified by the rectifier bridge BD, and charges a filter capacitor C. When the electric equipment enters into the stable working state, control switch in parallel with the current limiting resistor Rt is closed to eliminate the influence of the current limiting resistor Rt on the conversion efficiency.

During rectifier procedure, the bridge rectifier and surge control circuit in the prior art rectifies the current through two series rectifier diode in each half cycle. Because the rectifier diode has high positive voltage drop (typically about 1.2 V), so the power loss brought by the bridge rectifier takes a larger proportion in the whole power consumption, which increases the power consumption of the entire circuit. In addition, the cost of the control switch in parallel with the current limiting resistor is high, if the control switch is a semiconductor switch, it will bring a large extra power consumption, and if the control switch is a relay, although the relay has small power consumption which can be ignored, the large volume of the relay leads to an increase of the entire volume of the bridge rectifier and surge control circuit, which goes against the miniaturization of the circuit. Therefore, the bridge rectifier and surge control circuit in the prior art has the problem of high power consumption, high cost and large volume.

SUMMARY

The present invention aims at providing a fully-controlled bridge rectifying device with surge suppression function to solve the problem of high power consumption, high cost and large volume existing in the bridge rectifier and surge control circuit in the prior art.

The present invention is implemented by a fully-controlled bridge rectifying device with surge suppression function which is disposed in a electric equipment and connected with a EMI filter network, a anti-surge control signal generator configured to output a corresponding anti-surge control signal according to the work state of the electric equipment, and a filter capacitor in the electric equipment. The fully-controlled bridge rectifying device with surge suppression function comprises:

a driving module, a first controllable half-bridge module, an isolation driving module, a second controllable half-bridge module, a half-bridge module and a current limiting resistor;

wherein an input terminal of the driving module is connected to a DC power supply, a first control terminal and a fourth control terminal of the driving module, and a second control terminal and a third control terminal of the driving module, are respectively connected to a positive output terminal and a negative output terminal of the EMI filter network, a first control terminal and a second control terminal of the first controllable half-bridge module are respectively connected to a first output terminal and a second output terminal of the driving module, an output terminal of the first controllable half-bridge module and a ground terminal of the driving module are connected to a negative terminal of the filter capacitor, a first input terminal of the first controllable half-bridge module, a first input terminal of the second controllable half-bridge module and a first terminal of the half-bridge module are connected to the positive terminal of the EMI filter network, a second input terminal of the first controllable half-bridge module, a second input terminal of the second controllable half-bridge module and a second terminal of the half-bridge module are connected to the negative terminal of the EMI filter network, an output terminal of the second controllable half-bridge module is connected to the positive terminal of the filter capacitor, a control terminal, a first input terminal and a second input terminal of the isolation driving module are respectively connected to the anti-surge control signal generator, the positive output terminal and the negative output terminal of the EMI filter network, an output terminal of the isolation driving module is connected to a control terminal of the second controllable half-bridge module, the current limiting resistor is connected between an output terminal of the half-bridge module and the output terminal of the second controllable half-bridge module;

at the starting moment of the electric equipment, under the control of the driving module, the first controllable half-bridge module cooperates the half-bridge module to rectify the alternative current output from the EMI filter network and then charge the filter capacitor quickly, meanwhile the current limiting resistor suppresses the surge in the alternative current, and the anti-surge control signal make the isolation driving module control the second controllable half-bridge module to shut down; when the electrical equipment work from starting state transits to a stable work state, a work state of the first controllable half-bridge module remains the same, the isolation driving module drive the second controllable half-bridge module to be on under the control of the anti-surge control signal, the second controllable half-bridge module cooperates the first controllable half-bridge module to rectify the alternative current output from the EMI filter network and then provide direct current to the electric equipment, because the second controllable half-bridge module is on, the half-bridge module and the current limiting resistor stop working.

In the present invention, the electric equipment uses a fully-controlled bridge rectifying device with surge suppression function comprising a driving module, a first controllable half-bridge module, an isolation driving module, a second controllable half-bridge module, a half-bridge module and a current limiting resistor. At the starting moment of the electric equipment, the first controllable half-bridge module cooperates the half-bridge module to carry out the bridge rectifier for the alternative current to charge the filter capacitor quickly, and the surge is suppressed by the current limiting resistor, when the electrical equipment work from starting state transits to a stable work state, the first controllable half-bridge module cooperates the second controllable half-bridge module to carry out the fully-controlled bridge rectification for the alternative current to provide direct current to the electric device, the whole fully-controlled bridge rectifying device has the advantages of simple structure, low cost and small volume, and also effectively reduces the power consumption of the equipment, thereby solving the problem of high power consumption, high cost and large volume existing in the bridge rectifier and surge control circuit in the prior art.

DETAILED DESCRIPTION

To make the objectives, technical solutions and advantages of the present invention clearer, the present invention will be further described hereafter with reference to the accompany drawings and embodiments. It shall be understood that, the embodiments described herein are only intended to illustrate but not to limit the present invention.

In the embodiment of the present invention, the electric equipment uses a fully-controlled bridge rectifying device with surge suppression function comprising a driving module, a first controllable half-bridge module, an isolation driving module, a second controllable half-bridge module, a half-bridge module and a current limiting resistor. At the starting moment of the electric equipment, the first controllable half-bridge module cooperates the half-bridge module to carry out the bridge rectifier for the alternative current to charge the filter capacitor quickly, and the surge is suppressed by the current limiting resistor, when the electrical equipment work from starting state transits to a stable work state, the first controllable half-bridge module cooperates the second controllable half-bridge module to carry out the fully-controlled bridge rectification for the alternative current to provide direct current to the electric device, the whole fully-controlled bridge rectifying device has the advantages of simple structure, low cost and small volume, and also effectively reduces the power consumption of the equipment.

Figure 1:
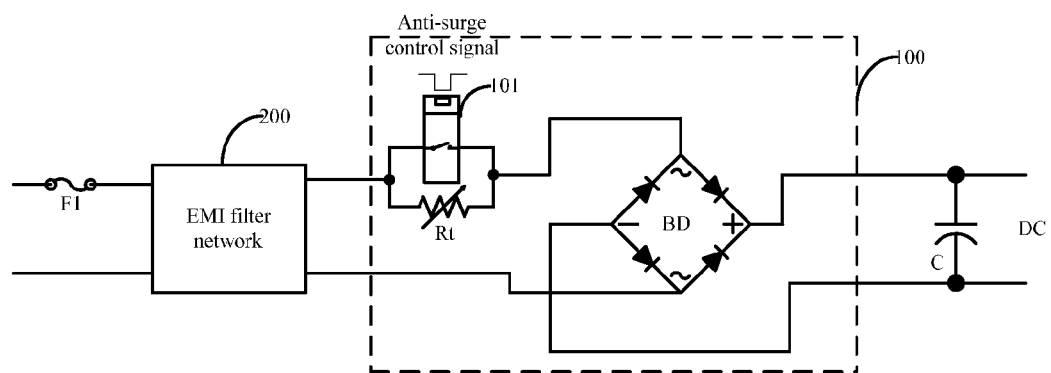
FIG. 1 is the structure diagram of the bridge rectifier and surge control circuit in the prior art.
Figure 2:
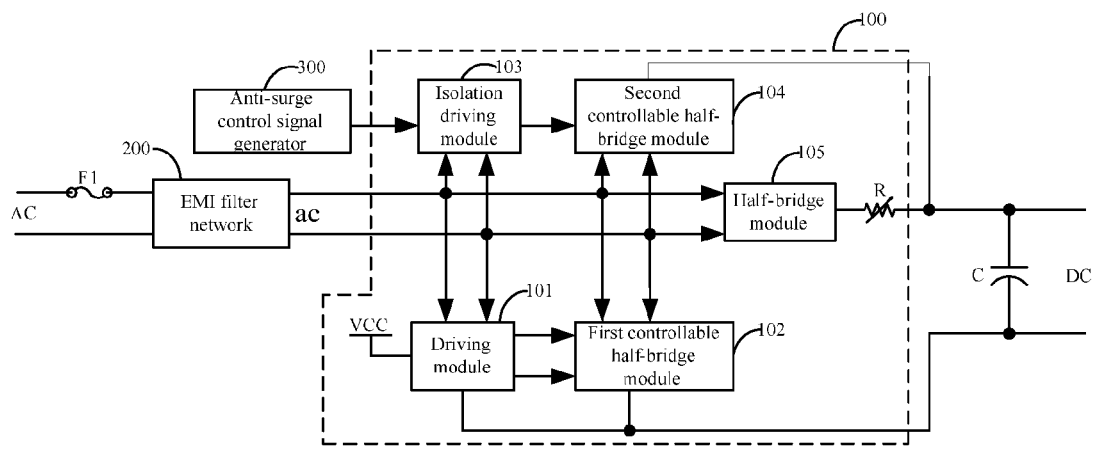
FIG. 2 is a module structure diagram of a fully-controlled bridge rectifying device with surge suppression function in the embodiment of the present invention.

FIG. 2 is a module structure diagram of a fully-controlled bridge rectifying device with surge suppression function in the embodiment of the present invention. For convenience, only the part related to the present invention is shown and is described in detail hereafter.

A fully-controlled bridge rectifying device with surge suppression function 100 is disposed in a electric equipment, and connected with a EMI filter network 200, a anti-surge control signal generator 300 configured to output a corresponding anti-surge control signal according to the work state of the electric equipment, and a filter capacitor in the electric equipment.

The fully-controlled bridge rectifying device 100 comprises:

a driving module 101, a first controllable half-bridge module 102, an isolation driving module 103, a second controllable half-bridge module 104, a half-bridge module 105 and a current limiting resistor 105.

An input terminal of the driving module 101 is connected to a DC power supply VCC, a first control terminal and a fourth control terminal of the driving module 101, and a second control terminal and a third control terminal of the driving module 101, are respectively connected to a positive output terminal and a negative output terminal of the EMI filter network 200, a first control terminal and a second control terminal of the first controllable half-bridge module 102 are respectively connected to a first output terminal and a second output terminal of the driving module 101, an output terminal of the first controllable half-bridge module 102 and a ground terminal of the driving module 101 are connected to a negative terminal of the filter capacitor C, a first input terminal of the first controllable half-bridge module 102, a first input terminal of the second controllable half-bridge module 104 and a first terminal of the half-bridge module 105 are connected to the positive terminal of the EMI filter network 200, a second input terminal of the first controllable half-bridge module 102, a second input terminal of the second controllable half-bridge module 104 and a second terminal of the half-bridge module 105 are connected to the negative terminal of the EMI filter network 200, an output terminal of the second controllable half-bridge module 104 is connected to the positive terminal of the filter capacitor C, a control terminal, a first input terminal and a second input terminal of the isolation driving module 103 are respectively connected to the anti-surge control signal generator 300, the positive output terminal and the negative output terminal of the EMI filter network 200, an output terminal of the isolation driving module 103 is connected to a control terminal of the second controllable half-bridge module 104, the current limiting resistor R is connected between an output terminal of the half-bridge module 105 and the output terminal of the second controllable half-bridge module 104.

At the starting moment of the electric equipment, under the control of the driving module 101, the first controllable half-bridge module 102 cooperates the half-bridge module 105 to rectify the alternative current output from the EMI filter network 200 and then charge the filter capacitor C quickly, meanwhile the current limiting resistor R suppresses the surge in the alternative current, and the anti-surge control signal make the isolation driving module 103 control the second controllable half-bridge module 104 to shut down; when the electrical equipment work from starting state transits to a stable work state, a work state of the first controllable half-bridge module 102 remains the same, the isolation driving module drive 103 controls the second controllable half-bridge module 104 to be on under the control of the anti-surge control signal, the second controllable half-bridge module 104 cooperates the first controllable half-bridge module 102 to rectify the alternative current output from the EMI filter network 200 and then provide direct current to the electric equipment, because the second controllable half-bridge module 104 is on, the half-bridge module 105 and the current limiting resistor R stop working.

Figure 3:
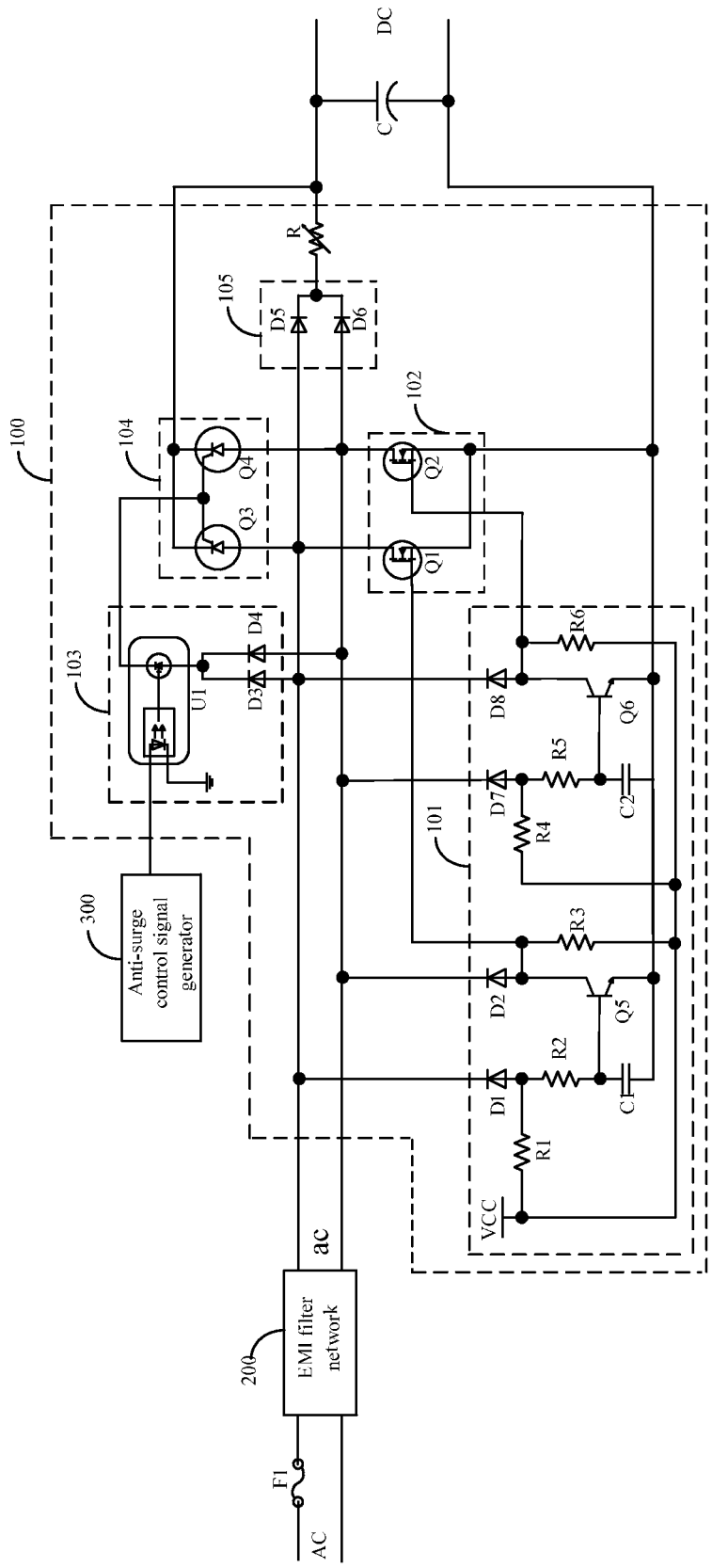
FIG. 3 is a structure diagram of an example circuit of a fully-controlled bridge rectifying device with surge suppression function in the embodiment of the present invention.

FIG. 3 is a structure diagram of an example circuit of a fully-controlled bridge rectifying device with surge suppression function in the embodiment of the present invention. For convenience, only the part related to the present invention is shown and is described in detail hereafter.

As one preferred embodiment of the present invention, the driving module 101 comprises:

a plurality of diodes D1, D2, D7 and D8, a plurality of resistors R1, R2, R3, R4, R5 and R6, a plurality of capacitors C1 and C2, and a plurality of bipolar transistors Q5 and Q6;

a cathode of the diode D1 and a cathode of the diode D2 are respectively the first control terminal and the control second terminal of the driving module 101; a cathode of the diode D7 and a cathode of the diode D8 are respectively the third control terminal and the fourth control terminal of the driving module 101; a first terminal of the resistor R1, a second terminal of the resistor R3, a first terminal of the resistor R4 and a second terminal of the resistor R6 are connected together to serve as the input terminal of the driving module 101; a second terminal of the resistor R1 and an anode of the diode D1 are connected to a first terminal of the resistor R2; a second terminal of the resistor R2 and a first terminal of the capacitor C1 are connected are connected to the base of the bipolar transistor Q5; a collector of the bipolar transistor Q5, an anode of the diode D2 and a first terminal of the resistor R3 are connected together to serve as the first output terminal of the driving module 101; a second terminal of the resistor R4, a first terminal of the resistor R5 and an anode of the diode D7 are connected together; a first terminal of the capacitor C2 and a second terminal of the resistor R5 are connected to the base of the bipolar transistor Q6; an anode of the diode D8, a collector of the bipolar transistor Q6 and a first terminal of the resistor R6 are connected together to serve as the second output terminal of the driving module 101; a second terminal of the capacitor C1, an emitter of the bipolar transistor Q5, a second terminal of the capacitor C2 and an emitter of the bipolar transistor Q6 are connected together to serve as the ground terminal of the driving module 101. In other embodiment of the present invention, the driving module 101 may be an IC (Integrated Circuit) or MCU (Micro Control Unit) with signal receiving, processing and distribution capacity. Developers can select one according to specific need. For example, if the electric equipment has a MCU, the MCU may be used as the driving module 101; if there is no MCU or IC, then the above mentioned driving module 101 comprising a plurality of diodes D1, D2, D7 and D8, a plurality of resistors R1, R2, R3, R4, R5 and R6, a plurality of capacitors C1 and C2, and a plurality of bipolar transistors Q5 and Q6 may be used to achieve the natural interaction control for the first controllable half-bridge module 102.

As one preferred embodiment of the present invention, the first control half-bridge module 102 comprises a plurality of NMOS transistors Q1 and Q2, a gate of the NMOS transistor Q1 and a gate of the NMOS transistor Q2 are respectively the first control terminal and the second control terminal of the first controllable half-bridge module 102, a drain of the NMOS transistor Q1 and a drain of the NMOS transistor Q2 are respectively the first input terminal and the second input terminal of the first controllable half-bridge module 102, a source of the NMOS transistor Q1 and a source of the NMOS transistor Q2 are connected together to serve as output terminal of the first controllable half-bridge module 102. In other embodiment of the present invention, the NMOS transistors Q1 and Q2 may be replaced by PMOS transistors, IGBTs (Insulated Gate Bipolar Transistor) or other semiconductor switching devices with switch features.

As one preferred embodiment of the present invention, the isolation driving module 103 comprises:

an optical coupler U1, a plurality of diodes D3 and D4;

an anode of a light emitting diode of the optical coupler U1 is the control terminal of the isolation driving module 103, an cathode of the light emitting diode of the optical coupler U1 is connected to the ground, an anode of the diode D3 and an anode of the diode D4 are respectively the first input terminal and the second input terminal of the isolation driving module 103, a cathode of the diode D3 and a cathode of the diode D4 are connected to an anode of a photosensitive diode of the optical coupler U1, a cathode of the photosensitive diode of the optical coupler U1 is the output terminal of the isolation driving module 103.

As one preferred embodiment of the present invention, the second controllable half-bridge module comprises 104: a plurality of silicon controlled rectifier Q3 and Q4, an anode of the silicon controlled rectifier Q3 and an anode of the silicon controlled rectifier Q4 are respectively the first input terminal and the second input terminal of the second controllable half-bridge module 104, a cathode of the silicon controlled rectifier Q3 and a cathode of the silicon controlled rectifier Q4 are connected together to serve as the output terminal of the second controllable half-bridge module 104, a control terminal of the silicon controlled rectifier Q3 and a control terminal of the silicon controlled rectifier Q4 are connected together to serve as the control terminal of the second controllable half-bridge module 104.

As one preferred embodiment of the present invention, the half-bridge module 105 comprises an anode of the diode D5 and an anode of the diode D6 are respectively the first input terminal and the second input terminal of the half-bridge module 105, a cathode of the diode D5 and a cathode of the diode D6 are connected together to serve as the output terminal of the half-bridge module 105.

The fully-controlled bridge rectifying device 100 is described further hereafter in conjunction with the work principle:

At the starting moment of the electric equipment, the driving module 101 control the NMOS transistors Q1 and Q2 to switch on and off alternatively according to the alternative current output by the EMI filter network 200, such that the NMOS transistors Q1 and Q2 and the diodes D5 and D6 forms the rectifying bridge circuit to rectify the alternative current output by the EMI filter network 200 and then charge the filter capacitor quickly, meanwhile, the current limiting resistor R suppresses the surge current in the alternative current, to ensure that the fully-controlled bridge rectifying device 100, the filter capacitor C and the other component are protected from damages caused by the surge current.

When the electric equipment enters into the stable working state (that is the voltage cross the filter capacitor C reaches the work voltage of the electric equipment), the anti-surge control signal generator 300 outputs a high level to serve as anti-surge control signal to switch on the optical coupler U1 to control the silicon controlled rectifiers Q3 and Q4 to be on subsequently. At that moment, the NMOS transistors Q1 and Q2, the silicon controlled rectifiers Q3 and Q4 form the rectifying bridge circuit to rectify the alternative current output by the EMI filter network 200 and then provide the direct current to the electric equipment.

In the above work principle, when the silicon controlled rectifiers Q3 and Q4 are on, the on-state voltage drops of the silicon controlled rectifiers Q3 and Q4 are generally lower than the positive voltage drop of the diode, therefore the conversion efficiency of the entire fully-controlled bridge rectifying device 100 is higher than the bridge rectifier in the prior art, and the power consumption will be decreased accordingly.

At the starting moment of the electric equipment, the diodes D5 and D6 are on, and the diodes D5 and D6 and the NMOS transistors Q1 and Q2 form the bridge rectifier circuit to carry out the rectifier. And the diodes D5 and D6 are connected to the current limiting resistor R, and the current limiting resistor R serves to suppress the surge current, in actual application, the diodes D5 and D6 can be the diodes which have small on state current and have a certain capacity of surge current, such as diodes with model number 1N5406 or S3M, which has low cost and small size that are far less than the cost and volume of the relay and other power semiconductor switching devices.

In the present invention, the electric equipment uses a fully-controlled bridge rectifying device with surge suppression function comprising a driving module, a first controllable half-bridge module, an isolation driving module, a second controllable half-bridge module, a half-bridge module and a current limiting resistor. At the starting moment of the electric equipment, the first controllable half-bridge module cooperates the half-bridge module to carry out the bridge rectifier for the alternative current to charge the filter capacitor quickly, and the surge is suppressed by the current limiting resistor, when the electrical equipment work from starting state transits to a stable work state, the first controllable half-bridge module cooperates the second controllable half-bridge module to carry out the fully-controlled bridge rectification for the alternative current to provide direct current to the electric device, the whole fully-controlled bridge rectifying device has the advantages of simple structure, low cost and small volume, and also effectively reduces the power consumption of the equipment, thereby solving the problem of high power consumption, high cost and large volume existing in the bridge rectifier and surge control circuit in the prior art.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A fully-controlled bridge rectifying device with surge suppression function, disposed in a electric equipment, and connected with a EMI filter network, a anti-surge control signal generator configured to output a corresponding anti-surge control signal according to the work state of the electric equipment, and a filter capacitor in the electric equipment, the fully-controlled bridge rectifying device with surge suppression function comprising:

a driving module, a first controllable half-bridge module, an isolation driving module, a second controllable half-bridge module, a half-bridge module and a current limiting resistor;

wherein an input terminal of the driving module is connected to a DC power supply, a first control terminal and a fourth control terminal of the driving module, and a second control terminal and a third control terminal of the driving module, are respectively connected to a positive output terminal and a negative output terminal of the EMI filter network, a first control terminal and a second control terminal of the first controllable half-bridge module are respectively connected to a first output terminal and a second output terminal of the driving module, an output terminal of the first controllable half-bridge module and a ground terminal of the driving module are connected to a negative terminal of the filter capacitor, a first input terminal of the first controllable half-bridge module, a first input terminal of the second controllable half-bridge module and a first terminal of the half-bridge module are connected to the positive terminal of the EMI filter network, a second input terminal of the first controllable half-bridge module, a second input terminal of the second controllable half-bridge module and a second terminal of the half-bridge module are connected to the negative terminal of the EMI filter network, an output terminal of the second controllable half-bridge module is connected to the positive terminal of the filter capacitor, a control terminal, a first input terminal and a second input terminal of the isolation driving module are respectively connected to the anti-surge control signal generator, the positive output terminal and the negative output terminal of the EMI filter network, an output terminal of the isolation driving module is connected to a control terminal of the second controllable half-bridge module, the current limiting resistor is connected between an output terminal of the half-bridge module and the output terminal of the second controllable half-bridge module; and at the starting moment of the electric equipment, under the control of the driving module, the first controllable half-bridge module cooperates the half-bridge module to rectify the alternative current output from the EMI filter network and then charge the filter capacitor quickly, meanwhile the current limiting resistor suppresses the surge in the alternative current, and the anti-surge control signal make the isolation driving module control the second controllable half-bridge module to shut down; when the electrical equipment work from starting state transits to a stable work state, a work state of the first controllable half-bridge module remains the same, the isolation driving module drive the second controllable half-bridge module to be on under the control of the anti-surge control signal, the second controllable half-bridge module cooperates the first controllable half-bridge module to rectify the alternative current output from the EMI filter network and then provide direct current to the electric equipment, because the second controllable half-bridge module is on, the half-bridge module and the current limiting resistor stop working.

2. The fully-controlled bridge rectifying device of claim 1, wherein the driving module comprises:

a plurality of diodes D1, D2, D7 and D8, a plurality of resistors R1, R2, R3, R4, R5 and R6, a plurality of capacitors C1 and C2, and a plurality of bipolar transistors Q5 and Q6; and a cathode of the diode D1 and a cathode of the diode D2 are respectively the first control terminal and the control second terminal of the driving module; a cathode of the diode D7 and a cathode of the diode D8 are respectively the third control terminal and the fourth control terminal of the driving module; a first terminal of the resistor R1, a second terminal of the resistor R3, a first terminal of the resistor R4 and a second terminal of the resistor R6 are connected together to serve as the input terminal of the driving module; a second terminal of the resistor R1 and an anode of the diode D1 are connected to a first terminal of the resistor R2; a second terminal of the resistor R2 and a first terminal of the capacitor C1 are connected are connected to the base of the bipolar transistor Q5; a collector of the bipolar transistor Q5, an anode of the diode D2 and a first terminal of the resistor R3 are connected together to serve as the first output terminal of the driving module; a second terminal of the resistor R4, a first terminal of the resistor R5 and an anode of the diode D7 are connected together; a first terminal of the capacitor C2 and a second terminal of the resistor R5 are connected to the base of the bipolar transistor Q6; an anode of the diode D8, a collector of the bipolar transistor Q6 and a first terminal of the resistor R6 are connected together to serve as the second output terminal of the driving module; a second terminal of the capacitor C1, an emitter of the bipolar transistor Q5, a second terminal of the capacitor C2 and an emitter of the bipolar transistor Q6 are connected together to serve as the ground terminal of the driving module.

3. The fully-controlled bridge rectifying device of claim 1, wherein the first control half-bridge module comprises a plurality of NMOS transistors Q1 and Q2, a gate of the NMOS transistor Q1 and a gate of the NMOS transistor Q2 are respectively the first control terminal and the second control terminal of the first controllable half-bridge module, a drain of the NMOS transistor Q1 and a drain of the NMOS transistor Q2 are respectively the first input terminal and the second input terminal of the first controllable half-bridge module, a source of the NMOS transistor Q1 and a source of the NMOS transistor Q2 are connected together to serve as output terminal of the first controllable half-bridge module.

4. The fully-controlled bridge rectifying device of claim 1, wherein the isolation driving module comprises:
an optical coupler U1, a plurality of diodes D3 and D4; and an anode of a light emitting diode of the optical coupler U1 is the control terminal of the isolation driving module, an cathode of the light emitting diode of the optical coupler U1 is connected to the ground, an anode of the diode D3 and an anode of the diode D4 are respectively the first input terminal and the second input terminal of the isolation driving module, a cathode of the diode D3 and a cathode of the diode D4 are connected to an anode of a photosensitive diode of the optical coupler U1, a cathode of the photosensitive diode of the optical coupler U1 is the output terminal of the isolation driving module.

5. The fully-controlled bridge rectifying device of claim 1, wherein the second controllable half-bridge module comprises: a plurality of silicon controlled rectifier Q3 and Q4, an anode of the silicon controlled rectifier Q3 and an anode of the silicon controlled rectifier Q4 are respectively the first input terminal and the second input terminal of the second controllable half-bridge module, a cathode of the silicon controlled rectifier Q3 and a cathode of the silicon controlled rectifier Q4 are connected together to serve as the output terminal of the second controllable half-bridge module, a control terminal of the silicon controlled rectifier Q3 and a control terminal of the silicon controlled rectifier Q4 are connected together to serve as the control terminal of the second controllable half-bridge module.

6. The fully-controlled bridge rectifying device of claim 1, wherein the half-bridge module comprises a plurality of diodes D5 and D6, an anode of the diode D5 and an anode of the diode D6 are respectively the first input terminal and the second input terminal of the half-bridge module, a cathode of the diode D5 and a cathode of the diode D6 are connected together to serve as the output terminal of the half-bridge module.

* * * * *